Figure 1:
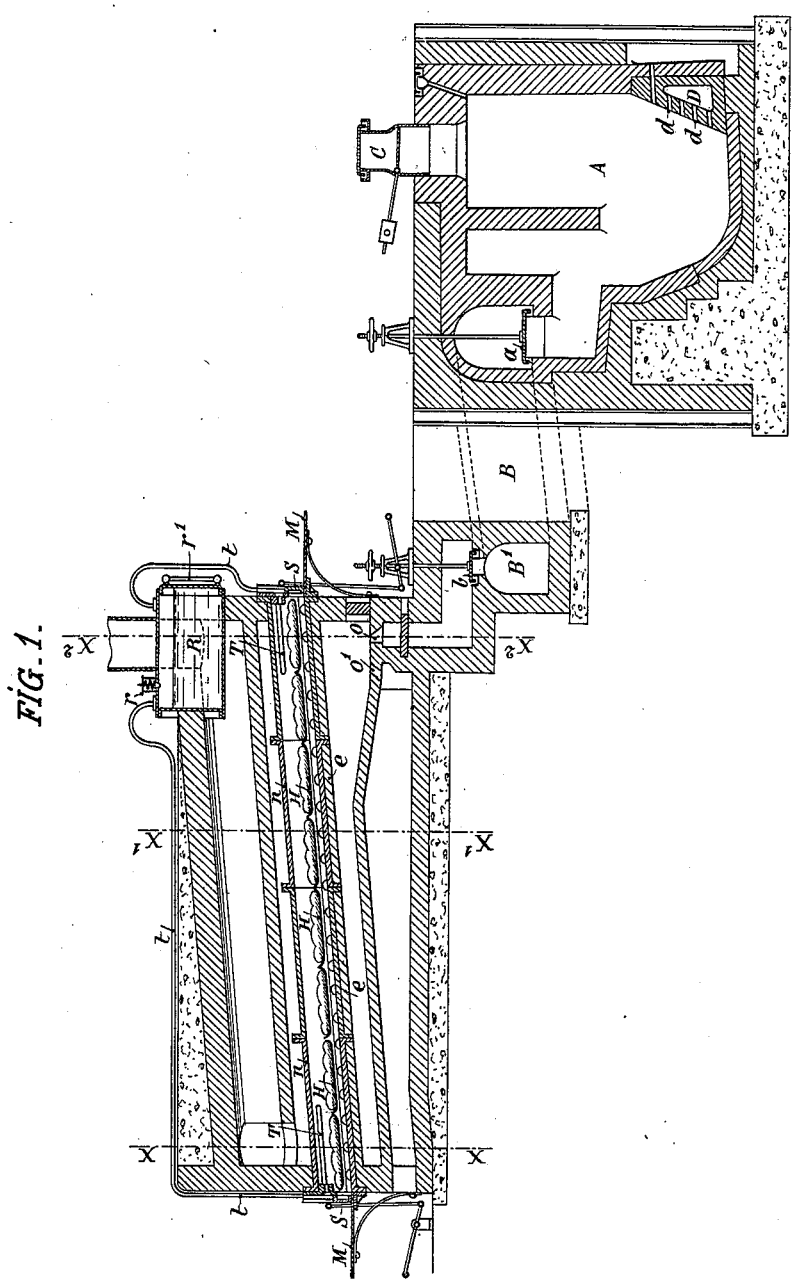

No. 665,475. Patented Jan. 8, 1901.
J. SCHWEITZER.
BAKER'S OVEN.
(Application filed Feb. 7, 1899.)

(No Model.) 3 Sheets—Sheet 1

Witnesses
Edwin D. Bartlett
Frank J. Ames

Inventor.
Joseph Schweitzer
per Herbert Sefton-Jones
Attorney.

No. 665,475. Patented Jan. 8, 1901.
J. SCHWEITZER.
BAKER'S OVEN.
(Application filed Feb. 7, 1899.)
(No Model.) 3 Sheets—Sheet 2.
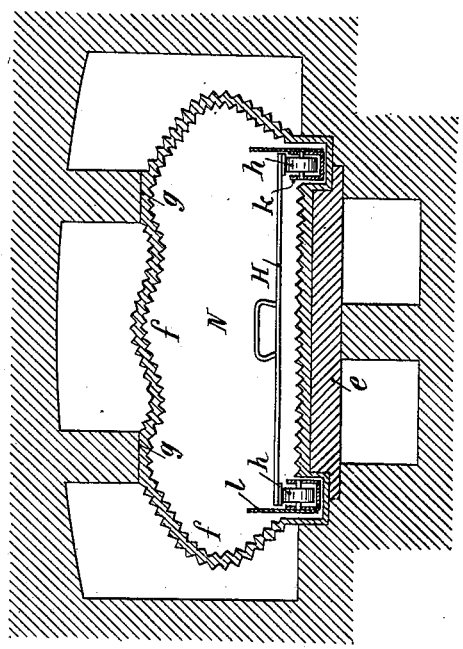
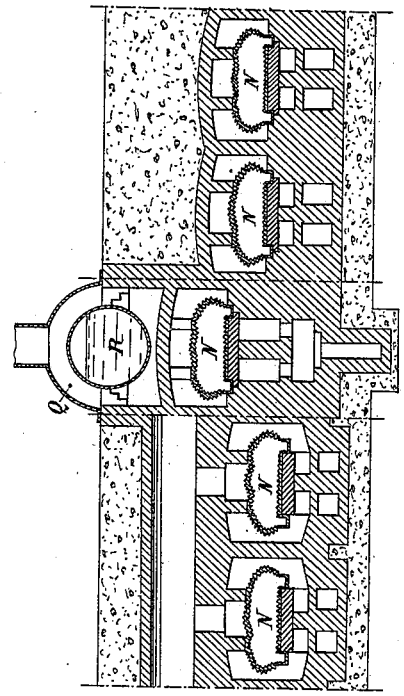
Witnesses
Edwin D. Bartlett.
Frank J. Ames.
Inventor.
Joseph Schweitzer
per Herbert Sefton-Jones
Attorney.

No. 665,475. J. SCHWEITZER. Patented Jan. 8, 1901.
BAKER'S OVEN.
(Application filed Feb. 7, 1899.)
(No Model.) 3 Sheets—Sheet 3.
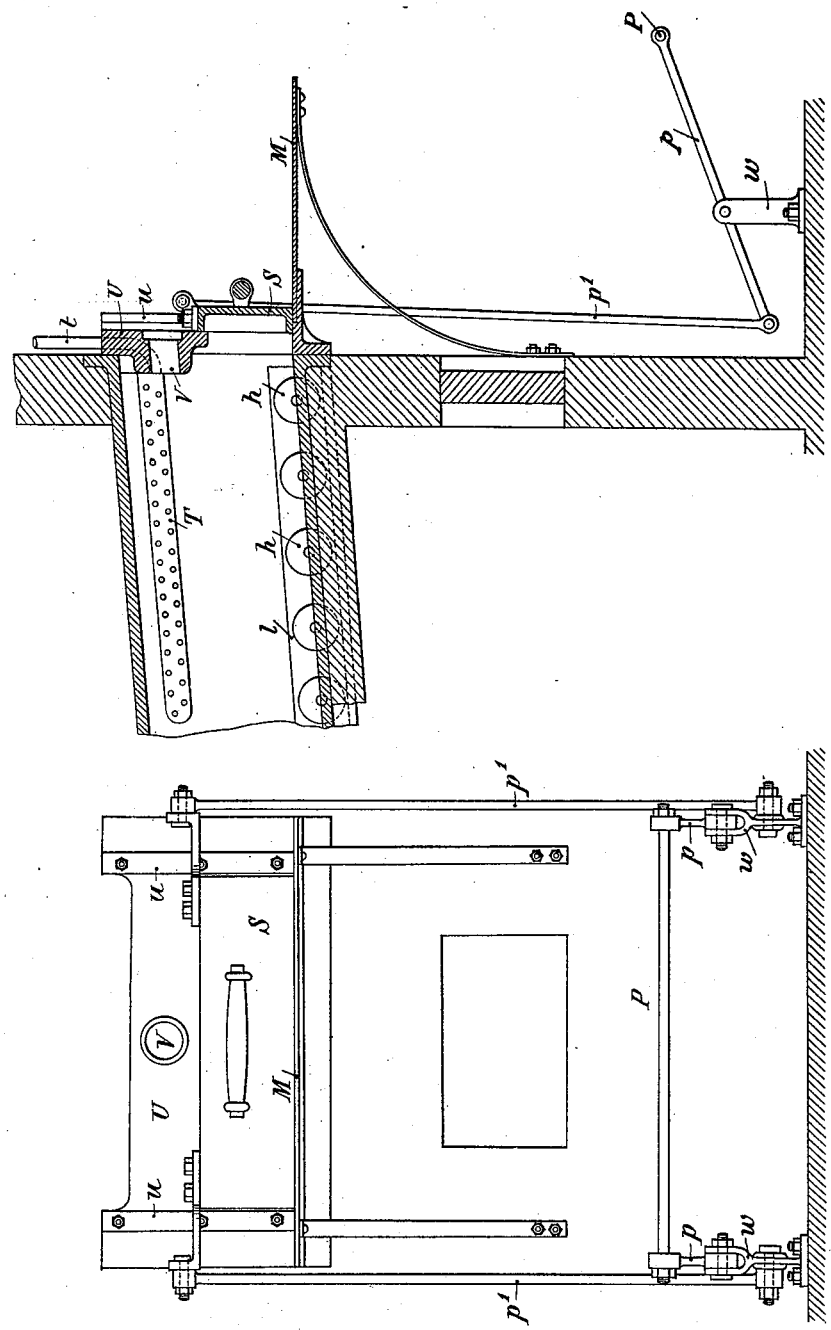

United States Patent Office.

JOSEPH SCHWEITZER, OF PARIS, FRANCE, ASSIGNOR TO LA SOCIÉTÉ INTERNATIONALE DE MEUNERIE ET DE PANIFICATION, OF SAME PLACE.

BAKER'S OVEN.

SPECIFICATION forming part of Letters Patent No. 665,475, dated January 8, 1901.

Application filed February 7, 1899. Serial No. 704,862. (No model.)

*To all whom it may concern:*

Be it known that I, JOSEPH SCHWEITZER, a citizen of the Republic of France, residing at Paris, France, have invented a new and useful Improvement in Bakers' Ovens, (for which applications for patent have been made in France, dated December 20, 1898; in Switzerland, dated December 27, 1898; in Austria, dated December 28, 1898; in Spain, dated December 30, 1898; in Belgium, dated January 9, 1899; in Hungary, dated January 9, 1899, and in Italy, dated January 20, 1899,) of which the following is a specification.

This invention relates to a novel system of baker's oven devised with the object of obtaining a regular and continuous baking of the bread under most favorable conditions and by aid of rational methods of heating which attain considerable economy of fuel. In this apparatus the baking takes place in a "closed vessel," so to speak, in retorts or recesses which are furnished with air-tight doors at their ends in such a manner that the steam introduced in these retorts or produced by the evaporation of the moisture of the loaves remains in contact with these loaves and surrounds them with an atmosphere particularly suited for a regular and uniform baking. The loaves for baking are placed on plates or shelves which move on suitable rollers placed on the bottom of the said retorts, and these retorts are placed in an inclined position, so that when a plate is taken out at the lowest end of the retort there is an empty space at the opposite (highest) end ready to receive a fresh load of loaves for baking. The said retorts are grouped parallel to each other in a brick or masonry oven, so as to form a battery heated, preferably, by means of gas produced by an ordinary gas-generator.

The invention will now be described in detail, with reference to the accompanying drawings, in which—

Figure 1 is a longitudinal section of an oven on this system along the axis of one of the retorts. Fig. 2 is a transverse section of the same oven along three different planes, the right-hand portion of the figure being a section on the lines X X, the left-hand portion a section on the lines $X'$ $X'$, and the middle portion a section on the lines $X^2$ $X^2$. Fig. 3 is a transverse section, on an enlarged scale, of a retort. Fig. 4 is a perspective view of a shelf for the loaves. Fig. 5 is a front view, on a larger scale, of the front part and of the door of one of these retorts. Fig. 6 is a sectional view of the front part of a retort.

As represented in the drawings, A is a gas-producer in which is produced "poor" gas (a mixture of hydrogen of hydrocarbons and of carbonic oxid) by burning therein any fuel without full supply of air. The fuel is introduced through the double slide-valve C, which is so placed as to prevent the entrance of air during charging. The air necessary to produce incomplete combustion is supplied by the pipe D and the inlets $d$. The oven proper includes a certain number of sloping cast-iron retorts N, placed parallel to each other in a brick oven and heated by furnaces fed by means of gas produced by the gas-producer A. This gas is admitted through the flue B, controlled by the damper $a$, into a channel $B'$ and distributed by the dampers $b$ to each of the burners placed below the retorts N. These burners are formed with openings $o$, which bring the gas from the gas-producer and are placed beside the openings $o'$, which supply the air necessary for combustion. The forms and respective positions of the said openings can be varied as desired according to the kind of burner employed or according to the composition of the gas furnished by the gas-producer. As shown by the section on a larger scale, Fig. 3, the cast-iron retorts are provided internally over their whole surface and externally over those parts which are in contact with the hot gases from the furnace with a series of ribs or longitudinal gills for the purpose of augmenting the surface for the transmission of the heat. They have also a certain number of undulations or longitudinal curves $f$, intended to properly divide and distribute the heat. Finally these retorts are provided with flat connecting-pieces adapted to unite with the brick walls of the flues as well as with two lateral grooves or slots in which are placed the rollers $h$, on which the shelves for the loaves travel. In order to facilitate the mounting and repairing of these rollers, they are preferably arranged in the following manner: The axles of the rollers of the same row are placed in a movable U-shaped iron K, so that a whole row of slides can easily be removed at once for examination or repair. The said U-shaped iron is moreover furnished with a lateral guide $l$, fixed to one of its wings, with the object of preventing any deviation of the shelf bearing the loaves.

The retorts are formed of a certain number of sections $n\ n$, which fit perfectly end to end. This arrangement has advantages from the point of view of casting and of transport, and retorts of any desired length can be formed as wanted by means of but one kind of piece by employing a larger or smaller number of sections. The lower part of the retorts rests on a casing of fire-proof material $e$, with the object of preventing direct contact of the combustion-gases with the wall of the retort where these gases would be hot enough to make the walls of the retort red-hot.

As has been said before, the loaves for baking are placed on rectangular shelves H, furnished with a frame which travels on the rollers $h$, before mentioned. These shelves, put in at the highest part of the retort, are moved by their own weight, in consequence of the inclination of the retort, so that when a shelf in the lower part is taken out there is close to the upper opening an empty space ready to receive a new shelf. The bottom of these shelves is formed of a material which allows of the free access of hot air to the lower part of the loaves, as represented in Fig. 4. As seen in this figure, the surface on which the loaves are placed to bake consists of a perforated sheet of iron, and the perforations can be of any desired form. The loaves taken out of the oven after baking on the iron plate thus perforated will have on their lower surfaces an exact reproduction of the perforations of the iron plate in low relief and of a darker tint than the rest of the loaf. In this way the under surface of the bread may be ornamented with any kind of designs or inscriptions, and especially with a trade-mark, by giving to the perforations of the sheet-iron of the shelf H the shape of the counterpart of the design I wish to reproduce. In the same manner I can, also by means of suitable plates, produce loaves bearing the date of the day on which they have been baked.

The retorts are further provided at each of their ends with doors hermetically closing to prevent all loss of heat or vapor and preferably arranged as hereinafter described with reference to Figs. 5 and 6. The cast-iron door S is furnished with a rim, carefully adjusted, which slides and fits exactly against the plate U, which forms the extremity of the retort and which is also adjusted for the purpose. The door is moreover guided into two lateral grooves $u$, so as to be able to slide vertically, and it can be operated conveniently by means of a pedal P and levers $p$, hinged on the supports $w$ and the bars $p'$. The plates U at the extremity of the retort are furnished, besides, with a peep-hole V, through which the baking can be watched.

Each group of retorts has a vapor-producing apparatus intended to keep up the desired degree of moisture in the retorts. This apparatus is principally composed of a boiler placed in the track of the gases escaping to the chimney in such a way as to utilize thus a certain quantity of the heat which would be otherwise lost. As seen in the drawings, this boiler R can be surrounded by an envelop Q, in which the gases on their way to the chimney circulate. This boiler is furnished with a safety-valve $r$ and a water-level $r'$. The steam produced is distributed in the retorts by means of a pipe $t$ and perforated tubes T.

To introduce the loaves into the oven, the operator places before him on the ledge M one of the perforated shelves H, indicated and described above, and empties on this shelf the trays containing the loaves to be baked, after which he presses on the pedal P to raise the door S. He then pushes in the shelf, which slides on the rollers H. The workman in charge of the baking is at the other side of the retort group and performs the inverse operation, taking out the shelves from the retorts in proportion as the loaves placed on the shelves are sufficiently baked.

Having thus described my invention and the means of putting it into practice, I declare that what I claim is—

1. An oven provided with a retort sloping downwardly from the entrance end thereof and having rolling devices, carriers constructed to be automatically progressed over said devices by the inclination of said retort, a heating-chamber surrounding said retort, said chamber being provided with an exit at or near the lower end of the retort, and means for introducing a heating medium near the entrance end of said retort, whereby the maximum temperature will be maintained at that end.

2. In a baker's oven, the combination of cast-iron retorts having longitudinal gills internally and externally, and longitudinal curves $f$; air-tight doors closing the said retorts at each end, the retorts having a sloping position in the interior of a brickwork oven, and having two lateral parallel rows of rollers inside, on which travel plates for carrying the bread to be baked, substantially as described.

3. In a baker's oven, the combination of the long cast-iron retorts N, provided internally and externally with longitudinal gills and longitudinal curves $f$, and composed of the segments $n$ fitted end to end; the said retorts being closed at each of their ends by an air-tight door and placed in a sloping position in the interior of a brickwork furnace, and provided with two lateral parallel rows of rollers on which travel the plates for holding the bread to be baked, substantially as described.

4. In a baker's oven having a sloping metallic retort externally heated and inclosed in masonry, said retort being closed at both ends by air-tight doors and provided with two internal parallel rows of rollers, the combination with the said retort of parallel lateral grooves at each side of said retort capable of receiving rollers on which plates carrying bread can progress.

5. In a baker's oven having a metallic retort heated externally and inclosed in masonry, said retort closed at both ends by air-tight doors and provided with two parallel rows of rollers, the combination with the said retort of lateral grooves and of removable U-shaped bars located in said grooves, and adapted to receive the axes of rollers arranged parallel substantially as set forth.

In witness whereof I have hereunto set my hand in presence of two witnesses.

JOSEPH SCHWEITZER.

Witnesses:
 AUGUSTE TOURNOL,
 JACQUES CONDOMY.